Patented Sept. 17, 1929

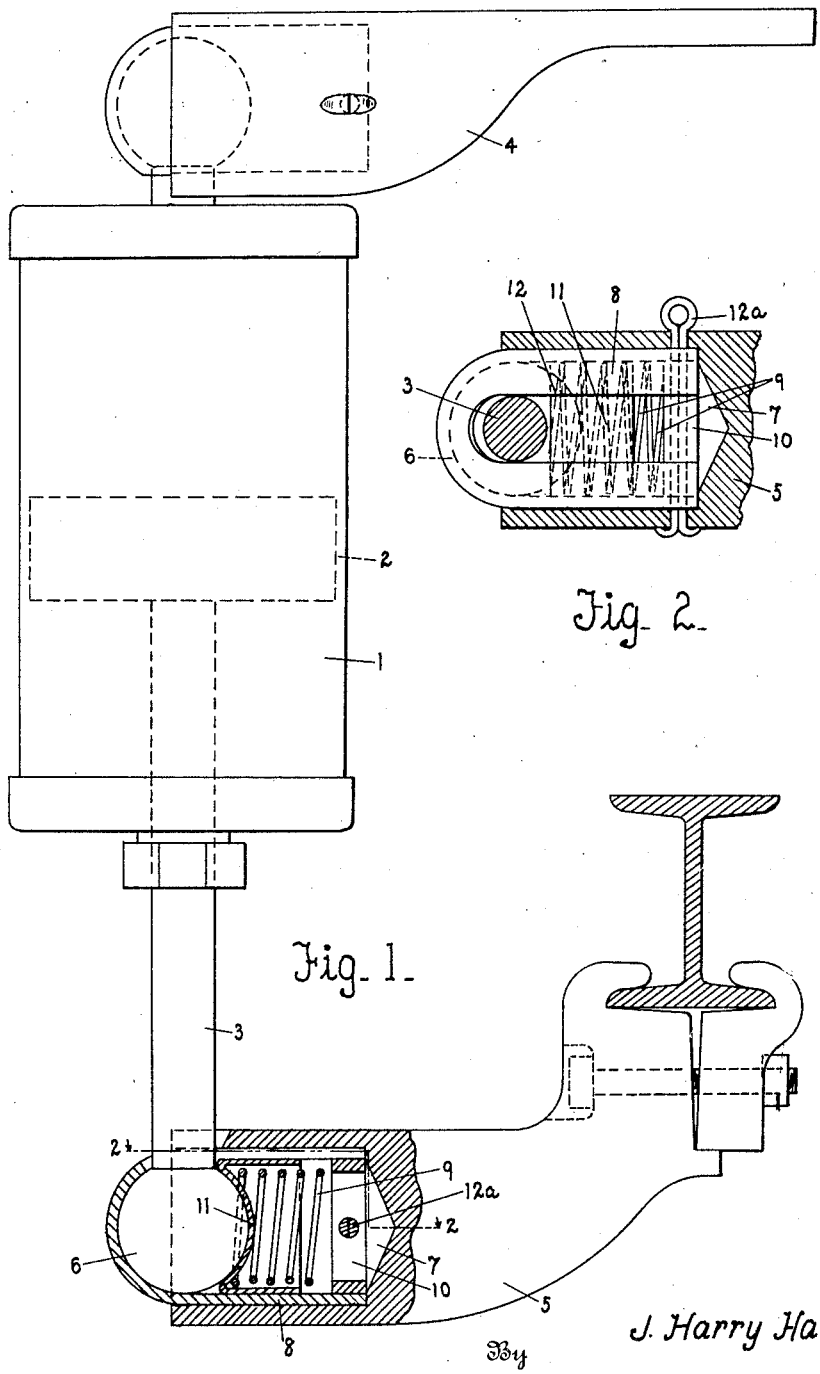

1,728,490

UNITED STATES PATENT OFFICE

JOHN HARRY HARLEY, OF DETROIT, MICHIGAN

BALL-AND-SOCKET JOINT

Original application filed July 22, 1925, Serial No. 45,295. Divided and this application filed October 30, 1926. Serial No. 145,251.

This invention relates to ball and socket joints, and particularly relates to ball and socket joints in which provision is made for a limited movement of the ball member lengthwise of the socket member. The present application is a divisional of my copending application Serial No. 45,295, filed July 22, 1925, and patented May 15, 1928, No. 1,669,828.

It is the object of the invention to provide a ball and socket joint particularly adapted for the connection of a shock absorber to a vehicle axle and also to the frame, or some other spring supported part of the vehicle.

Another object is to provide a ball and socket joint the assembly of which is facilitated by providing a plug member socketed to receive the ball member and adapted to be permanently assembled in proper engagement with the ball member as the final step in manufacture of the device, said plug member being adapted for a quick and easy engagement with the main socket member when the device is being installed on a vehicle.

These and various other objects the invention attains by the construction hereinafter described and illustrated in the accompanying drawings, wherein:

Figure 1 is a view in side elevation of a shock absorber of the piston and cylinder type, showing the herein described ball and socket joint employed to connect the cylinder and piston rod to suitable anchorage brackets, one of said joints being sectionally shown.

Figure 2 is a cross-section view of the same taken upon the line 2—2 of Figure 1.

In these views, the reference character 1 designates a shock absorber cylinder, 2 a piston working in said cylinder, and 3 a rod connected to said piston and extending through the lower head of the cylinder. The upper end of the cylinder and the lower end of said piston rod are connected to anchorage brackets 4 and 5 by ball and socket joints. These being of like construction a description of one thereof will suffice for both.

The piston rod 3 is formed at its lower end with a ball member 6 and the anchorage bracket 5 is formed with a cylindrical socket 7. It is desirable to afford the ball member a slight amount of play axially of the socket 7 (in addition to its universal movement) and it is further desirable to provide for simplifying and facilitating the installation of the shock absorber as far as possible. These results are attained by permanently universally connecting to the ball member 6 a plug in which said ball member is adapted to shift axially to a limited extent and which may be fitted readily into the socket 7 and secured therein. Said plug comprises an outer shell 8 open at one end to admit the ball member and hemispherically closed at its other end to form a seat for said member, a coiled spring 9 within said shell yieldably holding the ball member to said seat, and abutments 10 and 11 for said spring the former having the nature of a ring brazed or otherwise secured in the open end of the shell 8 and the latter being a sheet-metal stamping dished to conform to the ball member and cupped to receive the spring. The shell 8 is slotted lengthwise as indicated at 12 to form a passage way for the piston rod when the ball member is being inserted into said shell.

In completing the manufacture of the described shock absorber, the plug 8, 9, 10, 11 is permanently assembled in engagement with the ball 6, as has been described, and in the course of actual installation of the device upon a vehicle, said plug may very quickly be inserted in the socket 7 and secured therein. In the disclosed embodiment of the invention, the plug is held in said socket by a cotter pin 12$^a$, passed through the bracket 5, and diametrically through the shell 8 and ring 10.

Prior to this invention, ball and socket joints have made provision for a spring-resisted movement of the ball member in the socket member, but provision has not been made for establishing a final assembly of the spring and ball-engaging abutments in proper relation to the ball independently of the final mounting of the parts in the socket member. By permanently enclosing the spring and its abutments in a hollow plug secured universally to the ball member, the service station mechanic who makes the final installation upon a vehicle is relieved of the work of assembling the spring and its abutments and the proper tensioning of the spring is attended to as a part of the manufacture instead of being left to the doubtful discretion of the service station mechanic.

What I claim is:

1. In a ball and socket joint, the combination with a member having a socket opening in an end face thereof, and having a notch extending through the socket wall at said end, of a ball arranged partially within said socket and projecting from said end, a stem carrying said ball and accommodated in said notch of the socket member, a tubular shell fitting in said socket and having its outer end portion closed to retain said ball, said shell having a longitudinal slot to admit said stem, means securing said shell in said socket member, and means within said shell yieldably holding the ball against the closed outer end of said shell.

2. In a ball and socket joint, the combination with an anchorage member formed with a socket and a member formed with a ball, of a shell universally connecting said ball member to said anchorage member, said shell freely receiving said ball and being disposed in said socket and having a portion limiting movement of the ball in one direction, a spring in said shell yieldably opposing movement of the ball in the opposite direction, means securing said shell within said socket, and means holding said shell and spring in assembly with said ball independently of said anchorage member.

3. In a ball and socket joint, the combination with an anchorage member formed with a socket and a member formed with a ball, of a plug receiving said ball and adapted for a limited universal movement with respect to said ball and disposed in said socket, means holding said plug in assembly with said ball member independently of said anchorage member, and means securing said plug in said socket.

4. In a ball and socket joint, the combination with an anchorage member formed with a socket and a member formed with a ball, of a cylindrical plug disposed in said socket and universally connected to and carried by said ball independently of the anchorage member, said plug comprising means normally holding the ball definitely positioned relative to the socket axis, said means being resiliently yieldable under predetermined stress to afford a limited relative movement of the ball and plug along the axis of the latter, and means securing said plug in said socket.

5. In a ball and socket joint, the combination with an anchorage member formed with a socket, and a rod formed with a ball, of a plug comprising a shell rotatably receiving said ball and open at one end to admit the ball, said end being disposed in said socket and slotted lengthwise from its open end to accommodate said rod as the ball is entered in said shell, the other end of the shell being substantially closed, said plug further comprising a spring within said shell yieldably seating the ball against the closed end of the shell, means holding said plug assembled on the ball member independently of the anchorage member, and means securing said plug within said socket.

6. In a ball and socket joint, the combination with an anchorage member formed with socket, and a member formed with a ball, a shell universally carried by said ball and having one end disposed in said socket and receiving said ball in its other end, an abutment member rigidly carried by one end of said shell and engaging one side of the ball, an abutment member engaging the opposite side of the ball, a spring yieldably holding the last mentioned abutment member against the ball, means carried by the other end of the shell holding the spring in the shell and engaging the shell with the ball member independently of the anchorage member, and means securing the plug in said socket.

In testimony whereof I sign this specification.

J. HARRY HARLEY.